UNITED STATES PATENT OFFICE.

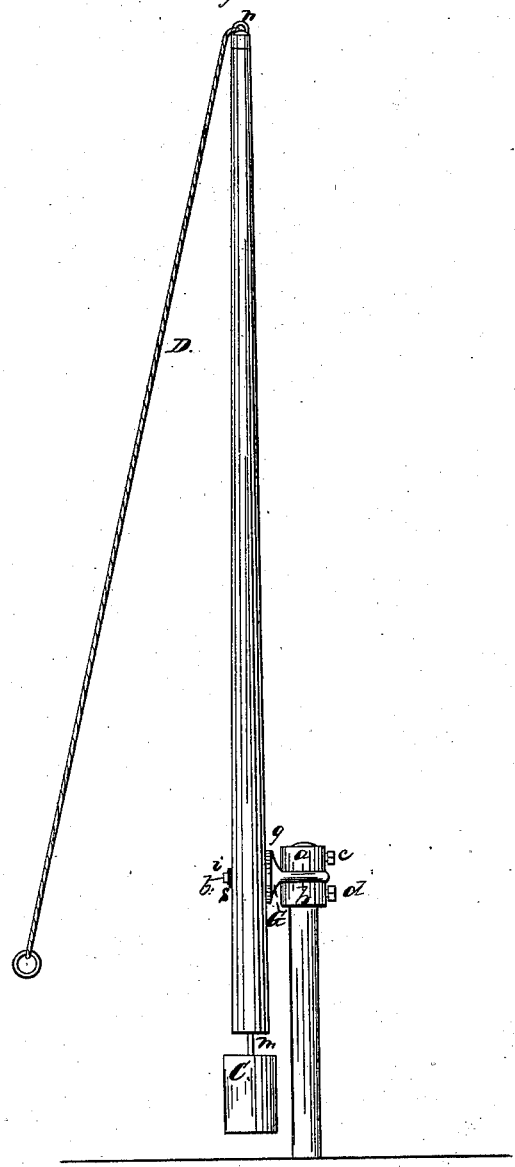
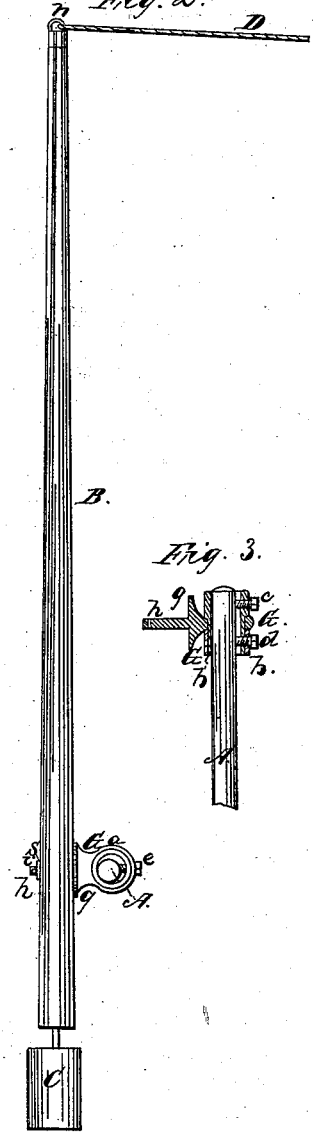
H. L. Folsom,
Tether,
Nº 56,028.      Patented July 3, 1866.
Witnesses
E. J. Brown
J. S. Brown
Inventor:
H. L. Folsom,
By his atty.
J. S. Brown.

H. L. FOLSOM, OF UPPER GILMANTON, NEW HAMPSHIRE.

IMPROVEMENT IN TETHERS.

Specification forming part of Letters Patent No. 56,028, dated July 3, 1866.

*To all whom it may concern:*

Be it known that I, HENRY L. FOLSOM, of Upper Gilmanton, in the county of Belknap and State of New Hampshire, have invented an Improved Tether for Tethering Animals; and I do hereby declare that the following is a full and exact description thereof, reference being had to the accompanying drawings, making part of this specification.

Figure 1 is a side elevation of the apparatus, the tether-pole being in a vertical position; Fig. 2, a top view of the same, the tether-pole being in a horizontal position; Fig. 3, a central vertical section of the swivel device, represented in place upon the tether-post.

Like letters designate corresponding parts in all of the figures.

Let A represent the tether-post, set or driven into the ground, being simply a round iron rod of suitable size and length; B, the tether-pole, to be pivoted, near its larger end, on the pivot-pin of the swivel-ring, and provided with a weight, c, at that end sufficient to overbalance the long end of the pole when free to vibrate on its pivot; and D, a rope or chain attached to the extremity of the long end of the pole by a staple, n, or its equivalent, the animal being secured to the free end of the said rope.

The tether-pole requires two pivot movements, one in a vertical plane, to bring the long end of the pole from a vertical to a horizontal position, or to any intermediate angles, according as the animal feeds close to or far from the tether-post, and the other in a horizontal plane, so that the animal may be free to feed in all directions from the post. These motions should be perfectly free, and the apparatus should be strong and not liable to get out of order or to entangle the rope as the animal travels about.

The swivel-ring G is fitted around a collar, a, being held by a solid shoulder thereof either above or below, and on the other side by a sleeve, b, which is slipped over the smaller end of the collar a till it abuts against the swivel-ring, and furnishes thereby another shoulder to hold the swivel-ring in place.

The swivel-ring may be supported by the solid shoulder or by that of the movable sleeve b, which is secured fast to the collar a by a set-screw, d, extending through both; and this set-screw may also screw in against the post A, as shown at Fig. 3, and thereby help hold the collar upon the post at any desired height.

Another set-screw, e, passing through the enlarged part of the collar a and bearing against the post A, also serves to hold the collar upon the post. This construction and arrangement allow the free horizontal swivel movement as desired.

The other motion is made around a pivot-pin, h, projecting horizontally from the swivel-ring G. This pin has a broad shoulder, g, which serves for the tether-pole to bear against as a guide, to keep the pole swinging in one plane, and prevents the bending of the pivot-pin h by any strain arising from pulling upon the tether-pole.

The pole is held upon the pivot by a pin, i, with a washer, f.

The weight C may be secured immediately to the short end of the pole, or indirectly, by a rod, m, or its equivalent.

What I claim as my invention, and desire to secure by Letters Patent, is—

The construction and arrangement of the swivel-ring G and its swivel-collar a and sleeve b, substantially as and for the purpose herein specified.

The above specification of my improved tether signed by me this 25th day of September, 1865.

H. L. FOLSOM.

Witnesses:
J. L. ODELL,
C. P. S. WARDWELL.